United States Patent [19]

Dildy, Jr.

[11] 3,950,617

[45] Apr. 13, 1976

[54] HELIUM SPEECH UNSCRAMBLER WITH PITCH SYNCHRONIZATION

[75] Inventor: Clell A. Dildy, Jr., Panama City, Fla.

[73] Assignee: The United States of America as represented by the Secretary of the Navy, Washington, D.C.

[22] Filed: Sept. 9, 1974

[21] Appl. No.: 504,634

[52] U.S. Cl. ........................ 179/1.5 H; 179/15.55 T

[51] Int. Cl.$^2$ ............................................ H04J 3/18

[58] Field of Search .................... 179/1.5 H, 15.55 T

[56] References Cited

UNITED STATES PATENTS

| | | | |
|---|---|---|---|
| 3,632,877 | 4/1969 | Gray ................................ | 179/1.5 H |
| 3,681,756 | 8/1972 | Burkhard et al. ................ | 179/1.5 H |
| 3,855,424 | 12/1974 | Tharmaratnam et al. .... | 179/15.55 T |

*Primary Examiner*—Kathleen H. Claffy
*Assistant Examiner*—E. S. Kemeny
*Attorney, Agent, or Firm*—Richard S. Sciascia; Don D. Doty; Harvey A. David

[57] ABSTRACT

A pitch synchronized helium speech unscrambler is disclosed as including a pair of bucket brigade analog delay lines which are timely and rapidly loaded with the electrical signal equivalents of human voice signals that are effectively supplied thereto by a receiving transducer. Said voice signal equivalents are then respectively unloaded more slowly from said pair of bucket brigade delay lines than they were loaded therein by a pair of different frequency clock generators driven in alternate successions by preprogrammed signals divided out from a master oscillator and in synchronism with a predetermined pitch portion of the speech signal received by said receiving transducer. The unloaded signals are then broadcast as acoustical voice signals by a transmitting transducer.

9 Claims, 4 Drawing Figures

HELIUM SPEECH UNSCRAMBLER WITH PITCH SYNCHRONIZATION

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention relates, in general, to time compression and expansion of multi-frequency signals, such as, for example, those occurring in human speech, and, in particular, is an improved method and means of changing or scaling the pitch of human speech and other signals without changing the syllabic rate, word rate, or other intelligence parameters thereof a deleterious amount. In even greater particularlity, the subject invention is a speech processor which decodes the speech of a human diver or other being located in a helium-oxygen environment — such as, for instance, those enviroments found in undersea habitats disposed at various and sundry water depths or other ambient pressure enviroments that are considerably greater than the earth's typical atmospheric pressure — and reproduces it in a form that is intelligible to the human ear and intellect.

DESCRIPTION OF THE PRIOR ART

Heretofore, a number of techniques have been employed to expand speech in time. One of the simplest of such techniques which have been used to date is to record the speech and then play it back at a speed that is slower than that used for the original recording. Unfortunately, the use of such technique resulted in a decrease in pitch in an amount that was proportional to the difference in the record and playback speeds; and, of course, if the pitch of the speed were decreased enough to be operative for most practical purposes, the intelligibility thereof was ordinarily adversely affected, sometimes to the extent that it was useless. Moreover, communication using such record-playback techniques could not, in many instances, be accomplished in real time, although it is recognized that the time delay involved could be relatively small, as far as recording and playing back are concerned.

Another device of the prior art is shown in U.S. Pat. No. 3,621,150, entitled Speech Processor For Changing Voice Pitch, by George W. Pappas. The invention taught therein proports to make speech of a diver located in a helium-oxygen atmosphere intelligible. In such case, the speech processor thereof makes use of the principal that normal speech may be chopped or segmented at certain rates and still retain its intellibility. Once segmented into very small pieces, every other piece thereof is discarded and the remaining pieces thereof are recombined. Then, the recombined pieces are played back at a slower speed that is dependent on the length of the discarded pieces by means of digital shift registers, the number of which may be considerable in order to be effective, and the use of which requires the associate use of analog-to-digital converters at the input and outputs thereof, as well as a filter at the output thereof. Hence, the number of components incorporated therein could be considerably, indeed; and the monetary cost and manufacturing complexities therefor could be prohibitive for many practical purposes.

In addition, U.S. Pat. No. 3,634,625, entitled Speech Unscrambler, by Geohegan, Jr., and Sherian, also discloses a prior art device which purports to convert shifted frequency speech that is relatively unintelligible into speech which is capable of being heard and understood by human beings. In some respects, it is similar to the present invention and the aforesaid U.S. Pat. No. 3,621,150 to Pappas, in that it periodically samples speech signals which are converted to digital form, placed in storage, and loaded from said storage, and converted back to analog form before being read out or otherwise used. Of course, in spite of such similarities with the instant invention, there are also some dissimilarities, both structurally and functionally, which are significant, inasmuch as they constitute improvement in the speech processing effected thereby, thus effecting improved speed intelligence and fidelity.

Other prior art methods and means for processing speech are discussed in the aforementioned patents; however, none thereof appear to anticipate or perform better than the subject invention. Moreover, neither they nor their speech processor predecessors appear to be as effective and as efficient as helium speech decoders as the invention described in detail below.

SUMMARY OF THE INVENTION

The subject invention is a new and unique speech processing apparatus which renders human speech within a predetermined pressurized helium-oxygen environment — such as, for example, that ordinarily existing within a swimmer/diver undersea habitat, or the like — more intelligible than it otherwise would be if it were left in its unnatural, squeaky, frequency-shifted, "Donald Duck" like form. Accordingly, by properly using the subject system, the communications between divers within a pressurized habitat, the communications between deep sea swimmers, and the communications between undersea divers and surface support people are facilitated.

In the present invention, the aforementioned speech processing occurs when speech signals are supplied to a receiving transducer for conversion from acoustical signals to electrical signals that are proportional thereto, the latter of which then are alternately loaded and unloaded into and out of a pair of bucket brigades. The loading and unloading of said pair of bucket brigades are controlled by a unique programmed synthesizer which, in turn, timely activates a pair of clock generators, the latter of which supply predetermined signals to said pair of bucket brigades, respectively, which effect said loading and unloading thereof. Also, said programmed synthesizer controls an analog switching means which, in turn, permits the bucket brigade being unloaded at any given instance to supply the output signals thereof to a transmitting transducer. As a result, even though the speech signals received by the aforesaid receiving transducer had been frequency-shifted as a result of their occurring in a pressurized environmental medium, the speech signals broadcast by the aforementioned transmitting transducer have been converted into speech signals which are sufficiently normal to be heard and understood by human beings. Thus, as previously suggested, the communications between divers and other beings located within pressurized or other hostile environments are improved to a considerable extent.

It is, therefore, an object of this invention to provide an improved helium speech processor and decoder.

Another object of this invention is to provide an improved speech scaler.

Still another object of this invention is to provide an improved method and means for discretely segmenting, delaying, and reconstructing predetermined portions of acoustical and electrical signals.

A further object of this invention is to provide an improved method and means for expanding and contracting signal frequencies, without adversely affecting the syllabic or word rate thereof to the extent that the data incorporated therein are no longer useful or intelligible.

Another object of this invention is to provide an improved method and means for eliminating the squeaky "Donald Duck" effect from human speech that is spoken in pressurized helium-oxygen atmospheres, such as, for instance, those which are employed as life-support atmospheres for divers working and living in deep underwater habitats.

Another object of this invention is to provide an improved method and means for sampling and expanding a speech or other acoustical or electrical signal containing a rather broadband of frequencies while retaining the essential pitch characteristics thereof, so as to make them intelligible to the human ear and intellect or otherwise useful.

Still another object of this invention is to effect the reduction of the pitch of human speech signals without substantially changing or adversely affecting the syllabic or word rate thereof.

Another object of this invention is to provide an improved helium speech unscrambler with an improved pitch synchronization system incorporated therein.

Another object of this invention is to provide a predetermined signal decoder which is easily and economically manufactured in miniaturized or other forms, operated, and transported.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
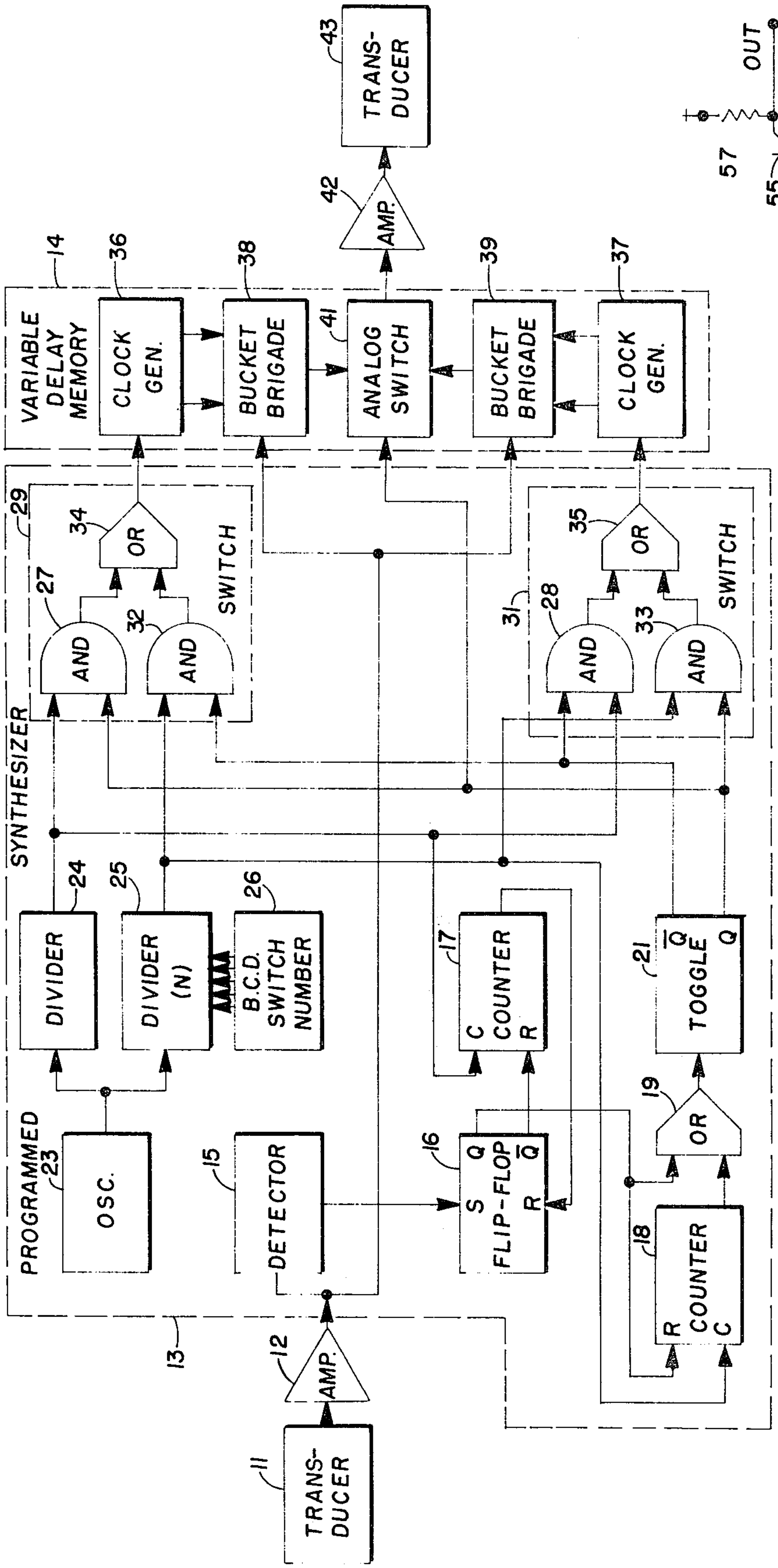
FIG. 1 is a block diagram of a preferred embodiment of the subject invention.

Referring now to FIG. 1, a preferred embodiment of the subject invention is shown as including a receiving transducer 11 which, in fact, may be an ordinary microphone or the like or any other suitable instrument which will receive human speech and convert it into electrical signals that are proportional thereto. The output of transducer 11 is connected to the input of a signal processor 12 which, in this particular instance, is an amplifier. However, it should be understood that a signal processor 12 may include amplifiers, filters, thresholders, and any other component or components deemed necessary to put the output signal from transducer 11 into a more useful and suitable form.

The output of amplifier 12 is connected to the inputs of two subsystems incorporated within the invention, viz., a programmed synthesizer 13 and a variable delay memory 14. In actuality, amplifier 12 has its output connected to the input of a detector 15, the input of which constitutes the input to the aforesaid program synthesizer 13.

The output of detector 15 is connected to the set (S) input of a flip-flop 16 which also contains a reset input (R), as well as Q and not $\overline{Q}$ outputs. The not $\overline{Q}$ output of flip-flop 16 is connected to the reset input of a nine bit counter 17, with the output thereof connected to the aforesaid reset input of flip-flop 16.

The $\overline{Q}$ of flip-flop 16 is connected to the reset input of another nine bit counter 18 and into one of the inputs of an OR circuit 19. The output of counter 18 is connected to the other input of said OR circuit 19, and the output thereof is connected to the toggle input of a toggle type bistable multivibrator 21.

A 2 MHz oscillator 23 has the output thereof connected to the inputs of a divide by 10 divider 24 and a divide by N divider 25. In addition to the aforementioned data signal input to divider 25, it also has a plurality of inputs which are connected to a like plurality of outputs of a binary coded decimal switch 26, representing a predetermined number N, in this particular instance, preferably a number N that is between 10 and 30.

The output of the aforementioned divider 24 is connected to one of the inputs of And gates 27 and 28 of switches 29 and 31, respectively. The output of divider 25 is connected to one of the inputs of and gates 32 and 33, likewise respective parts of the aforementioned switches 29 and 31. The other input of and gate 27 is connected to the other input of and gate 33 and the Q output of the aforementioned toggle 21. The other input of the gate 32 is connected to the other input of and gate 28 and to the not $\overline{Q}$ output of said toggle 21.

The output of divider 25 is also connected to the count input of the aforesaid nine bit counter 18.

The outputs of and gates 27 and 32 are connected to the inputs of an OR circuit 34, and the outuputs of and gates 28 and 33 are connected to the inputs of an OR circuit 35, thereby completing the circuitry of the aforementioned switches 29 and 31, respectively.

The outputs of OR circuits 34 and 35, of course, constitute the output of said switches 29 and 31 and are respectively connected to the frequency control inputs of a pair of clock generators 36 and 37.

The outputs of the aforesaid clock generators 36 and 37 are respectively connected to the clock inputs of a pair of bucket brigades 38 and 39. At this time, it would perhaps be noteworthy that bucket brigades 38 and 39 may be any of the conventional type bucket brigade delay lines that are commercially available. Of course, they are well known in the art as being analog shift registers and, if so desired, may be purchased from the N. V. Philips Gloeilamtensabrieken of Eindohoven, Netherland. Bucket brigade delay lines suitable for incorporation in this invention are discussed in the IEEE Journal of Solid State Circuits, Volume SC-4, Number N3, of the June 1969 issue, in an article entitled Bucket Brigade Electronics — New Possibilities for Delay Time-Axis Conversion and Scanning, at page 131. In addition, any of the bucket brigades shown in U.S. Pat. No. 3,745,383, entitled Improved Bucket Brigade Delay Line, by Frederick Leonard Johan Sangster, may be incorporated in the subject invention as said bucket brigades 38 and 39, if so desired.

The outputs from bucket brigades 38 and 39 are respectively connected to the data signal inputs of an analog switch 41, the switching control input of which is connected to the Q output of the aforementioned toggle 21. The output of analog switch 41, in fact, constitutes the output of the aforementioned variable delay memory circuit and is connected to the input of another signal processor, in this particular instance, an amplifier 42, and the output of amplifier 42 is connected to the input of a transmitting transducer 43. Of course, transmitting transducer 43 may be of any suitable, conventional type which converts electrical energy into acoustical energy that is proportional thereto. In many instances, it may be an ordinary speaker of the type that is found in radio and television sets, or, in the alternative, it could be earphones or any other appropriate readout or utilization apparatus (not shown). Referring back to counter 17 and divider 24, it should be noted that the output of said divider 24 is also connected to the count input of said counter 17.

It would appear, at this time, to be noteworthy that all of the elements and components of the block diagram of FIG. 1 are well known and conventional per se. Therefore, it should be understood that it is their new and unique interconnections and interactions which result in the system constituting this invention and which perform in such manner as to effect the objectives mentioned above.

Figure 2:
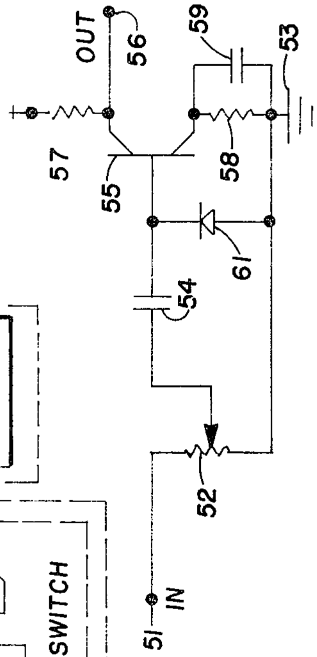
FIG. 2 is a schematic diagram of a detector that may be incorporated in the system of FIG. 1.
Figure 3:
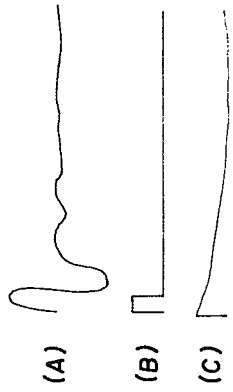
FIG. 3 is a graphical representation of idealized waveforms occurring within the detector of FIG. 2.

Referring now to FIG. 2, there is shown a detector of the type which is preferred as the aforementioned detector 15 of FIG. 1. Of course, merely because the detector of FIG. 2 is preferred as the type of detector to be used as detector 15 in FIG. 1 does not mean that other well known and conventional detectors may not be substituted therefor. However, in this particular instance, it has been experimentally determined that the circuit of FIG. 2 tends to perform the detector function in an optimum manner, and, thus, it tends to optimize the pitch synchronization portion of the invention, as well as the invetnion in toto. The detector of FIG. 2 includes an input terminal 51 which is connected through a potentiometer 52 to ground 53. The movable arm of potentiometer 52 is connected through a capacitor 54 to the base of a small signal, NPN, transistor 55 (such as a 2N2484 transistor), the collector of which is connected to an output terminal 56 and through a resistor 57 to a suitable positive direct current voltage. The emitter of transistor 55 is connected through a resistor 58 to ground, and a bypass capacitor 59 is connected in parallel with said resistor 58. The cathode of a diode 61 is connected to the base of said transistor 55, and the anode thereof is connected to the aforesaid ground 53.

Because FIGS. 3 through 6 illustrate various and sundry idealized signal waveforms that timely occur within the subject invention, they will be discussed more fully below during the discussion of the operation of the invention.

MODE OF OPERATION

The operation of the invention will now be discussed briefly in conjunction with all of the figures of the drawing.

Referring first to FIG. 1, it may readily be seen, that if human speech is spoken into microphone or receiving transducer 11, the acoustical energy supplied thereto will be converted into proportional electrical energy which is further processed into a more useful form — such as, for instance, by amplification, filtering, thresholding, or the like by signal processor herewith designated as amplifier 12. The more useful output signal from amplifier 12 then takes two courses, one of which is to detector 15 and the other of which is to the control inputs of bucket brigades 38 and 39, the latter of which will be discussed first. As mentioned above, each of bucket brigades 38 and 39 is timely activated so as to effect alternate operations thereof by means which will be discussed more fully subsequently. However, at this time, it should be recognized that because the 512 bit bucket brigade delay lines incorporated in the subject invention as delay lines 38 and 39 are key components of the subject invention and, hence, increase the performance thereof, it would appear that the simple discussion thereof is warranted at this time, in order to insure that there is a reasonable understanding of why the subject invention is unique and produces the new and improved results set forth in the above stated objectives.

Until such time as the bucket brigade delay line was invented, the delay of an analog signal in an analog delay line ordinarily proved to be complex and cumbersome, inasmuch as the problem had to be solved, as a general rule, by electro-mechanical techniques such as those inherently occurring in magnetic recording and the like. Of course, in theory, LC Networks could be used for delay line purposes, but because of the range of memory capacity covered thereby is not optimum for the purposes of this invention, the use thereof is neither desirable nor preferable. Furthermore, due to the copious quantities of sections of said LC Networks required thereby, the compact design thereof is not possible, and even more important, distortion usually accumulates therein at unacceptable levels. Such adverse distortions accumulate therein, for the most part, as a result of the incorporation of the inductive elements which tend to deviate in their behavior from an ideal reactive element more so than due to capacitors. Of course, said inductive elements are exceedingly difficult to miniaturize; consequently, when integrated circuit technology devised an analog shift register employing only capacitive type elements as the memory elements therefor without inductive elements being combined therewith, the state of the art of the analog delay line advanced to where, when included in the subject invention, would constitute a new and unique combination of elements which, in turn, produces vastly improved results heretofore unobtainable by any prior art means not using them.

Bucket brigade delay lines 38 and 39 of FIG. 1 constitute the aforementioned new electronic variable delay lines for analog data processing and, as previously indicated, become key factors in the superb performance obtained from this invention. Because the basis therefor is a chain of storage capacitors in charge-transfer circuits which act as an analog shift register with extremely variable shift rate, they have become known as bucket brigade circuits. Information is stored therein in an array of capacitors not directly at a charge level but, rather, as a charge deficit. Accordingly, only one transistor per storage capacitor is required, which makes it considerably less complex than the analog delay line of the prior art.

The bucket brigade lines incorporated in this invention use two complementary clock signals, with a frequency equal to the sampling frequency applied to the input signal. From a performance standpoint, such delay lines allow the interchange between bandwidth and delay within wide limits. Of course, the signal delay which is effected internally therein can be accurately controlled or charged electronically. Since each storage capacitor thereof is located between the collector and the base of a switching transistor within each stage, an analog delay line so constructed simply acquires the form of a series connection of transistors, each of which has a relatively large parathetic capacitance.

The performance of the bucket brigade type of analog delay line is dependent upon the interconnection and interaction between successive signal samples which travel along the capacitor chain. Therefore, it may be seen that the electrical signal to be delayed therein is sampled and stored in a cascade of capacitors that are interconnected by electronic devices that are actuated at the frequency of the signal sampler. Inasmuch as a new sample cannot be stored in a capacitor before the signal sample existing therein is completely removed, only half the number of capacitors incorporated therein actually store any information at any given instant, with the others thereof being empty at that time.

Because the aforesaid functions are performed in bucket brigade delay lines which are made up of transistors and capacitors only, only one transistor is needed for the abovementioned type of switching operation. Of course, such would be more readily evident if reference were made to the aforementioned sales and information literature of the Philip Research Laboratories of Eindohven, Netherland. In any event, it should at least be understood that as the sampling interval is completed, the information is transferred from one odd capacitor to the next odd capacitor by a charge deficit replenishment technique, which, in turn, is most beneficial (in the subject invention) when it is combined with the other associated and previously described components of FIG. 1. The fact that it also results in being an analog shift register which may be controlled electronically instead of being, say, a digital shift register and the fact that only two thereof are required as a minimum, considerable saving, both economically and space wise, is effected.

In the device of FIG. 1, bucket brigade delay lines 38 and 39 are respectively driven by a pair of clock generators 36 and 37 in alternation in accordance with the switching arrangement effected by switches 29 and 31 and their associated circuitry. The condition of said switches 29 and 31 are caused to be alternated in such manner that the signal frequency from the output of oscillator 23 causes a predetermined frequency signal to be effected by divider 25 as a result of binary coded decimal, two decade switch 22 supplying a predetermined number (N) thereto. The signal output frequency from divider 24 and divider 25 are such as to effectively supply the control signal of one frequency to clock generator 36 at one half the cycle thereof for supplying another frequency signal to clock generator 37 during the other half of the cycle. Of course, when said cycles are switched every 512 bits as a result of the running of said dividers and oscillator 23 that control signal which had previously been supplied to clock generator 36 is subsequently supplied to clock generator 37. The division ratio of dividers 24 and 25 is determined externally by inserting a number N which, for the purpose of this explanation, is considered to be the equivalent of any integer from 10 to 30, although other numbers may be used, if so desired.

Bucket brigade delay lines 38 and 39 are connected through analog switch 41 to amplifier 42 and transducer 43. The timely synchronization of the unloading of said bucket brigade 38 and 39 is, thus, effected by the timely switching of analog switch 41, the reversible switching operation of which is controlled by the input control signal supplied thereto by the Q output of the aforementioned toggle 21.

Although there are a number of commercially available detectors that would be suitable for use as detector 15, in order to obtain optimum performance from the subject invention, the detector of FIG. 2 was specifically designed and incorporated as said detector 15 in the system of FIG. 1.

The function of detector 15 is quite straightforward. When a voice signal similar to that shown in FIG. 3(A) is supplied to input terminal 51, the positive pulse waveform of FIG. 3(B) occurs at output terminal 56, and the voltage waveform of FIG. 4(C) may, if so desired, be obtained at the emitter of transistor 55. Hence, it may readily be seen that positive pulse detection is effected thereby that timely synchronizes the setting of flip-flop 16 which, in turn, effectively synchronizes the alternate switching of analog switch 41, thereby synchronizing the alternate unloading of bucket brigades 38 and 39 with the initial positive pulses of the voice signals spoken into receiving transducer 11. Of course, such synchronism causes the intelligibility of the voice signals broadcast by transducer 43 to be improved to a considerable extent.

Figure 4:
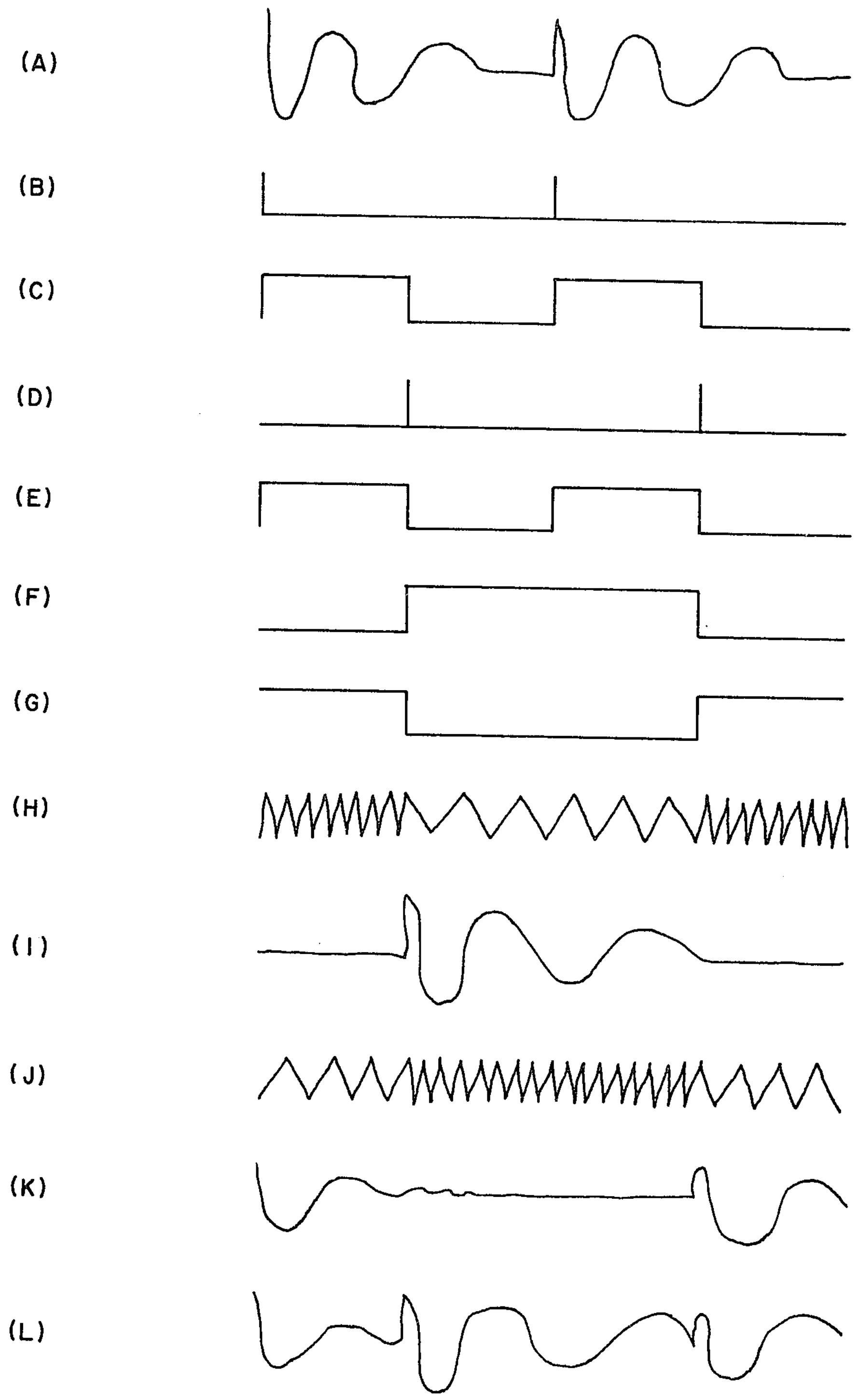
FIG. 4 is a graphical representation of idealized signal waveforms occurring within the system of FIG. 1.

The mode of operation can perhaps best be summarized by a brief discussion thereof with respect to FIG. 4 of the drawing.

As a voice signal similar to that shown in FIG. 4(A) is received from transducer 11 by detector 15, the positive peaks thereof shown in FIG. 4(B) occur at the output thereof which sets flip-flop 16 and removes, by means of the waveform of FIG. 4(C), the reset from counter 17, thereby allowing counter 17 to start counting 512 write clock pulses supplied from the output of divider 24.

At the end of 512 write clock pulses, flip-flop 16 is reset by the first pulse of FIG. 4(D), and bucket brigade 39 has been written into or loaded with voice signals for 2.56 milliseconds as a result of the output waveforms of FIG. 4(E), 4(F), and 4(G), being generated at the outputs of OR circuit 19 and toggle 21, respectively. The resetting of flip-flop 16 effectively causes toggle 21 to change state, but counter 18 was held in the reset mode and, thus, not allowed to count at that time. Once toggle 21 has been flipped, bucket brigade 39 is read out or unloaded, and writing into or loading of bucket brigade 38 begins. Hence, switch 31 is enabled, and sends a signal similar to that shown in FIG. 4(H) to clock generator 37, which, in turn, effects the timely loading and unloading of bucket brigade 39 in synchronism with the initial positive pulses of the voice signals of the aforementioned FIG. 4(A).

If another voice synchronous pulse is received within 5.12 milliseconds, the same cycles are repeated but the read and write functions occur in reverse order.

In any event, when bucket brigade 39 is unloaded the speech waveform of FIG. 4(I) loaded therein is read out.

FIG. 4(J) shows the writing and reading signals occurring in the output from switch 29. Of course, they are essentially the reverse of those shown in FIG. 4(H), and they cause bucket brigade 38 to timely unload previously stored voice signals similar to those shown in FIG. 4(K).

Because the outputs of bucket brigades 39 and 38 are alternately sampled in synchronism with the aforementioned initial positive voice peaks, a single signal flows from the output thereof which is similar to that shown in FIG. 4(L). Obviously, FIG. 4(L) is a timely composite of the lower speed — that is, expanded — voice signals of FIGS. 4(I) and 4(K), and when the signal of FIG. 4(L) is broadcast as an acoustical signal by transmitting transducer 43, it becomes a speech signal that is intelligible to the human ear, because it does not contain the aforesaid deleterious "Donald Duck" characteristics therein.

In the event that the positive initial peak voice signals of FIG. 4(A) do not occur for a time period in excess of 5.12 milliseconds, counter 18 becomes activated as a result of its counting 512 pulses from divider 25, which, in turn, supplies the necessary signal through OR circuit 19 to the toggle input of toggle 21, thereby causing bucket brigades 38 and 39 to change functions every 5.12 milliseconds.

B.C.D. switch 26 preferably contains a number N of 20 in this particular preferred embodiment of the invention; however any number between 10 and 30 may be used therefor.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A pitch synchronized speech unscrambler, comprising in combination:

a first transducer;

a first bucket brigade delay line having a driving input, a loading input, and an unloading output, with the loading input thereof effectively connected to the output of said first transducer;

means connected to the driving input of said first bucket brigade delay line for timely effecting the loading thereof in response to a first signal having a predetermined first frequency;

a second bucket brigade delay line having a driving input, a loading input, and an unloading output, with the loading input thereof effectively connected to the output of said first transducer;

means connected to the driving input of said second bucket brigade delay line for timely effecting the loading thereof in response to a second signal having a predetermined second frequency;

means for generating said first signal having said first predetermined frequency;

means for generating said second signal having said second predetermined frequency;

a detector effectively connected to the output of said first transducer;

a flip-flop having a set input, a reset input, a Q output and a $\bar{Q}$ output, with the set input thereof connected to the output of said detector;

a first counter having a count input, a reset input, and an output, with the count input thereof connected to an output of said first predetermined frequency signal generating means, with the reset input thereof connected to the $\bar{Q}$ output of said flip-flop, and with the output thereof connected to the reset input of said flip-flop;

a second counter having a count input, a reset input, and an output, with the count input thereof connected to an output of said second predetermined frequency signals generating means, and with the reset input thereof connected to the Q output of said flip-flop;

an OR circuit having a pair of inputs and an output, with one of the inputs thereof connected to the Q output of said flip-flop, and with the other input thereof connected to the output of said second counter;

a toggle having an input, a Q output and a $\bar{Q}$ output, with the input thereof connected to the output of said OR circuit, with the Q output thereof connected to an input of said first predetermined frequency signal generating means, and with the $\bar{Q}$ output thereof connected to an input of the aforesaid second predetermined frequency signal generating means;

selector switch means having a drive input, a pair of data inputs, and an output, with the drive input thereof connected to the Q output of said toggle, and with the pair of data inputs thereof respectively connected to the unloading outputs of said first and second bucket brigade delay lines for effecting the unloading thereof in respective synchronization with said first and second signals; and a second transducer effectively connected to the output of the aforesaid selector switch means.

2. The device of claim 1, wherein said first transducer comprises an electroacoustical transducer for receiving human speech signals and converting them into electrical signals that are proportional thereto.

3. The device of claim 1, wherein said means connected to the loading input of said first bucket brigade delay line for timely effecting the loading thereof in response to a first signal having a predetermined first frequency comprises a clock generator.

4. The device of claim 1, wherein said means connected to the loading input of said second bucket brigade delay line for timely effecting the loading thereof in response to a second signal having a predetermined second frequency comprises a clock generator.

5. The device of claim 1, wherein said means for generating said first signal having said predetermined frequency comprises:

an oscillator;

a first divider connected to the output of said oscillator;

a first And gate having a pair of inputs and an output, with one of the inputs thereof connected to the output of said first divider, and with their other input thereof adapted for being connected for response to a first predetermined timing signal;

a second divider connected to the output of said oscillator;

a second And gate having a pair of inputs and an output, with one of the inputs thereof connected to the output of said second divider, and with the other input thereof adapted for being connected for response to a second predetermined timing signal; and an OR circuit having a pair of inputs and an output, with the inputs thereof connected to the outputs of said first and second And gates, respectively.

6. The device of claim 1, wherein said means for generating said second signal having a predetermined second frequency comprises:

an oscillator;

a first divider connected to the output of said oscillator;

a first And gate having a pair of inputs and an output, with one of the inputs thereof connected to the output of said first divider, and with their other input thereof adapted for being connected for response to a first predetermined timing signal;

a second divider connected to the output of said oscillator;

a second And gate having a pair of inputs and an output, with one of the inputs thereof connected to the output of said second divider, and with the other input thereof adapted for being connected for response to a second predetermined timing signal; and an OR circuit having a pair of inputs and an output, with the inputs thereof connected to the outputs of said first and second And gates, respectively.

7. The invention of claim 5, further characterized by a binary coded decimal switch having an output signal representing a predetermined number N.

8. The invention of claim 6, further characterized by a binary coded decimal switch having an output signal representing a predetermined number N.

9. The device of claim 1, wherein said second transducer comprises an electroacoustical transducer for broadcasting human speech signal in proportion to the electrical signals supplied thereto.

* * * * *